United States Patent
Bae

(10) Patent No.: US 11,223,878 B2
(45) Date of Patent: Jan. 11, 2022

(54) ELECTRONIC DEVICE, SPEECH RECOGNITION METHOD, AND RECORDING MEDIUM

(71) Applicant: SAMSUNG ELECTRONICS CO., LTD., Suwon-si (KR)

(72) Inventor: Jae Hyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/756,382

(22) PCT Filed: Oct. 25, 2018

(86) PCT No.: PCT/KR2018/012750
§ 371 (c)(1),
(2) Date: Apr. 15, 2020

(87) PCT Pub. No.: WO2019/088571
PCT Pub. Date: May 9, 2019

(65) Prior Publication Data
US 2020/0280767 A1     Sep. 3, 2020

(30) Foreign Application Priority Data

Oct. 31, 2017   (KR) .......................... 10-2017-0143213

(51) Int. Cl.
*H04N 5/445*     (2011.01)
*H04N 21/482*    (2011.01)
(Continued)

(52) U.S. Cl.
CPC .......... *H04N 21/482* (2013.01); *G10L 15/08* (2013.01); *G10L 15/26* (2013.01); *H04N 21/42203* (2013.01); *G10L 2015/088* (2013.01)

(58) Field of Classification Search
CPC ............... H04N 21/482; H04N 21/472; H04N 21/42203
(Continued)

(56) References Cited

U.S. PATENT DOCUMENTS 4,570,232 A * 2/1986 Shikano .................. G10L 15/12
                                                          704/241
5,598,557 A * 1/1997 Doner ................. G06F 16/3346
(Continued)

FOREIGN PATENT DOCUMENTS

JP      5474723       4/2014
JP      2015-52743    3/2015
(Continued)

OTHER PUBLICATIONS

Extended European Search Report dated Sep. 21, 2020 in corresponding European Patent Application No. 18874744.8, 8 pages.
(Continued)

*Primary Examiner* — Michael B. Pierorazio
(74) *Attorney, Agent, or Firm* — Staas & Halsey LLP

(57) ABSTRACT

An electronic device is disclosed. The electronic device comprises: a microphone for receiving voice; a memory for storing a plurality of text sets; and a processor for converting the voice, received via the microphone, into text, searching for words common to the converted text with respect to each of the plurality of text sets, and determining at least one text set of the plurality of text sets on the basis of the ratio of the searched common words.

13 Claims, 8 Drawing Sheets

(51) Int. Cl.
  *G10L 15/08* (2006.01)
  *G10L 15/26* (2006.01)
  *H04N 21/422* (2011.01)
(58) Field of Classification Search
  USPC .......................................................... 725/39
  See application file for complete search history.

(56) References Cited

U.S. PATENT DOCUMENTS

| | | | | |
|---|---|---|---|---|
| 6,085,160 | A * | 7/2000 | D'hoore | G09B 19/06 704/2 |
| 6,442,518 | B1 * | 8/2002 | Van Thong | G10L 15/26 704/235 |
| 6,473,778 | B1 * | 10/2002 | Gibbon | G06F 40/103 715/201 |
| 7,047,191 | B2 * | 5/2006 | Lange | G10L 15/005 348/468 |
| 7,065,524 | B1 * | 6/2006 | Lee | G06Q 30/02 |
| 7,092,888 | B1 * | 8/2006 | McCarthy | G10L 15/063 379/88.01 |
| 7,509,385 | B1 * | 3/2009 | Rittmeyer | G06Q 10/107 709/206 |
| 7,729,917 | B2 * | 6/2010 | Miyamoto | G10L 15/22 704/270 |
| 7,739,253 | B1 * | 6/2010 | Yanovsky | G06F 16/9535 707/705 |
| 7,801,910 | B2 * | 9/2010 | Houh | G06F 16/745 707/765 |
| 7,873,654 | B2 * | 1/2011 | Bernard | G06F 16/3329 707/769 |
| 7,962,331 | B2 * | 6/2011 | Miller | G10L 15/01 704/215 |
| 8,121,432 | B2 * | 2/2012 | Dorai | G06F 16/7834 382/276 |
| 8,131,545 | B1 * | 3/2012 | Moreno | G10L 15/04 704/235 |
| 8,423,363 | B2 * | 4/2013 | Gupta | G10L 15/22 704/255 |
| 8,498,670 | B2 | 7/2013 | Cha et al. | |
| 8,572,488 | B2 * | 10/2013 | Phillips | G06F 16/4393 715/716 |
| 9,183,832 | B2 | 11/2015 | Bak et al. | |
| 9,392,324 | B1 | 7/2016 | Maltar et al. | |
| 9,711,149 | B2 | 7/2017 | Han et al. | |
| 9,830,908 | B2 | 11/2017 | Kwon et al. | |
| 10,573,302 | B2 * | 2/2020 | Lee | G08C 17/02 |
| 2002/0055950 | A1 * | 5/2002 | Witteman | G06F 16/40 715/203 |
| 2002/0093591 | A1 * | 7/2002 | Gong | G06F 16/7834 348/515 |
| 2003/0004716 | A1 | 1/2003 | Haigh et al. | |
| 2003/0025832 | A1 * | 2/2003 | Swart | H04N 21/2343 348/461 |
| 2003/0061028 | A1 * | 3/2003 | Dey | G06F 16/40 704/9 |
| 2003/0169366 | A1 * | 9/2003 | Lenzi | H04N 7/10 348/461 |
| 2003/0206717 | A1 * | 11/2003 | Yogeshwar | G06F 16/71 386/328 |
| 2004/0096110 | A1 * | 5/2004 | Yogeshwar | G06F 16/51 382/239 |
| 2005/0227614 | A1 * | 10/2005 | Hosking | H04N 7/165 455/3.06 |
| 2006/0015339 | A1 * | 1/2006 | Charlesworth | G10L 15/187 704/251 |
| 2007/0124147 | A1 * | 5/2007 | Gopinath | G10L 15/19 704/257 |
| 2007/0124788 | A1 * | 5/2007 | Wittkoter | H04N 21/8133 725/112 |
| 2007/0214164 | A1 * | 9/2007 | MacLennan | G06F 16/90 |
| 2008/0066138 | A1 * | 3/2008 | Bishop | H04N 21/4884 725/137 |
| 2008/0255844 | A1 * | 10/2008 | Wu | G10L 15/193 704/255 |
| 2008/0266449 | A1 * | 10/2008 | Rathod | H04N 21/4828 348/468 |
| 2008/0270134 | A1 * | 10/2008 | Miyamoto | G10L 15/26 704/251 |
| 2009/0171662 | A1 * | 7/2009 | Huang | G10L 15/1822 704/251 |
| 2010/0009720 | A1 | 1/2010 | Cha et al. | |
| 2010/0091187 | A1 * | 4/2010 | Topiwalla | H04N 21/4858 348/468 |
| 2011/0022386 | A1 * | 1/2011 | Gatzke | G10L 15/26 704/235 |
| 2011/0040559 | A1 * | 2/2011 | Kim | G10L 21/055 704/231 |
| 2012/0101817 | A1 * | 4/2012 | Mocenigo | G10L 15/063 704/231 |
| 2012/0253799 | A1 * | 10/2012 | Bangalore | G10L 15/183 704/231 |
| 2017/0186422 | A1 | 6/2017 | Lev-Tov et al. | |

FOREIGN PATENT DOCUMENTS

| | | |
|---|---|---|
| KR | 10-0764247 | 10/2007 |
| KR | 10-0825690 | 4/2008 |
| KR | 10-2010-0006089 | 1/2010 |
| KR | 10-2012-0135855 | 12/2012 |
| KR | 10-1495183 | 2/2015 |
| KR | 10-1502003 | 3/2015 |
| KR | 10-2015-0089145 | 8/2015 |
| KR | 10-2016-0060405 | 5/2016 |

OTHER PUBLICATIONS

International Search Report dated Feb. 13, 2019, in corresponding International Patent Application No. PCT/KR2018/012750.
Written Opinion of the International Searching Authority dated Feb. 13, 2019, in corresponding Patent Application No. PCT/KR2018/012750.
European Office Action dated Apr. 21, 2021 from European Application No. 18874744.8, 6 pages.
So et al., "Implementation of Search Method based on Sequence and Adjacency Relationship of User Query", Journal of the Korean Institute of Intelligent Systems vol. 21, No. 6, pp. 724-729, 2011.
Korean Office Action dated Oct. 20, 2021 from Korean Application No. 10-2017-0143213.

* cited by examiner

ELECTRONIC DEVICE, SPEECH RECOGNITION METHOD, AND RECORDING MEDIUM

CROSS-REFERENCE TO RELATED APPLICATIONS

This application is a U.S. National Stage Application which claims the benefit under 35 U.S.C. § 371 of International Patent Application No. PCT/KR2018/012750 filed on Oct. 25, 2018, which claims foreign priority benefit under 35 U.S.C. § 119 of Korean Patent Application No. 10-2017-0143213 filed on Oct. 31, 2017 in the Korean Intellectual Property Office, the contents of both of which are incorporated herein by reference.

TECHNICAL FIELD

The disclosure relates to an electronic device, a speech recognition method, and a recording medium, and more particularly relates to an electronic device capable of recognizing an entire text from utterance of some text by using a ratio of included words extracted from text converted from an input speech, a speech recognition method, and a recording medium.

BACKGROUND ART

The electronic device is a device electrically executing specific functions according to instructions of a user, and a technology that the electronic device recognizes a speech of a user and executes a function intended by a user when receiving an instruction of a user has been provided.

Conventionally, when recognizing an instruction of a user through a user's speech, if a result of speech recognition coincided with a candidate word or sentence, it was determined that the corresponding word or sentence was recognized, and the electronic device operated a function or provided a feedback to a user by using the recognized result.

Accordingly, if a candidate word or sentence to be recognized is long or a user does not utter the entire word or sentence, the function operation is not performed or the feedback is not made, since it is not determined that the corresponding candidate word or sentence is recognized. Thus, there was a problem of hindrance of usability of speech recognition against the user's intention.

In addition, a conventional technology of performing post-processing with respect to a result of speech recognition also had a problem, since basically the recognition was operated only when a final result coincided with a candidate word or sentence.

DISCLOSURE

Technical Problem

An object of the disclosure is to provide an electronic device capable of recognizing an entire text from utterance of some text by using a ratio of included words extracted from text converted from an input speech, a speech recognition method, and a recording medium.

Technical Solution

According to an embodiment of the disclosure for achieving the above-mentioned object, there is provided an electronic device including a microphone for receiving a speech, a memory for storing a plurality of text sets, and a processor configured to convert the speech received via the microphone into text, search for words in each of the plurality of text sets common to words in the converted text, and determine at least one text set among the plurality of text sets based on a ratio of the searched common words.

The processor may be configured to determine at least one text set based on a first ratio of the searched common words in the text set and a second ratio of the searched common words in the converted text.

The processor may be configured to determine a text set having at least one ratio of the first ratio and the second ratio that is higher than a predetermined ratio as the at least one text set.

The processor may be configured to, based on the number of text sets having a ratio higher than the predetermined ratio being more than one, display a UI in which the plurality of text sets are arranged in the order of at least one ratio of the first ratio and the second ratio of each of the plurality of text sets.

The processor may be configured to determine one text set among the plurality of text sets based on a ratio of the extracted words in the plurality of text sets and an order of the extracted words.

The processor may be configured to search for candidate text sets among the plurality of text sets based on the extracted words and an order of the extracted words, and determine at least one text set based on a ratio of the extracted words in the searched candidate text sets.

The processor may be configured to execute an event corresponding to the determined text set.

The electronic device may further include a communicator for receiving EPG information, and the processor may be configured to store broadcast program information included in the EPG information in the memory as the text set.

The processor may be configured to, based on the determined text set corresponding to the EPG information, generate an event regarding a broadcast program corresponding to the EPG information.

The event regarding the broadcast program may be at least one of changing, recording, scheduled recording, and scheduled viewing of a channel of the broadcast program.

According to another embodiment of the disclosure, there is provided a speech recognition method of an electronic device, including converting an input speech into text, extracting a plurality of words based on the converted texts, searching for words in each of a plurality of text sets stored in advance common to the plurality of extracted words and determining at least one text set among the plurality of text sets based on a ratio of the searched common words, and executing an event corresponding to the determined text set.

The determining may include calculating a first ratio of the searched common words in the text set, calculating a second ratio of the searched common words in the converted text, and selecting at least one text set based on the calculated first ratio and the calculated second ratio.

The selecting may include selecting a text set having at least one ratio of the first ratio and the second ratio that is higher than a predetermined ratio as at least one text set.

The speech recognition method may further include, based on the number of text sets having a ratio higher than the predetermined ratio being more than one, displaying a UI in which the plurality of text sets are arranged in the order of at least one ratio of the first ratio and the second ratio of each of the plurality of text sets.

The determining may include determining one text set among the plurality of text sets based on a ratio of the extracted words in the plurality of text sets and an order of the extracted words.

The determining may include a first step of searching for candidate text sets based on the extracted words in the plurality of text sets and an order of the extracted words, and a second step of determining at least one text set based on a ratio of the extracted words in the searched candidate text sets.

The speech recognition method may further include receiving EPG information, and storing broadcast program information included in the EPG information in a memory as the text set.

The executing an event may include, based on the determined text set corresponding to the EPG information, executing an event regarding a broadcast program corresponding to the EPG information.

The event regarding the broadcast program is at least one of changing, recording, scheduled recording, and scheduled viewing of a channel of the broadcast program.

According to still another embodiment of the disclosure, there is provided a computer-readable recording medium including a program for executing a speech recognition method of an electronic device, the speech recognition method including converting an input speech into text, extracting a plurality of words based on the converted texts, determining at least one text set among a plurality of text sets stored in advance based on a ratio of the extracted words in the plurality of text sets, and executing an event corresponding to the determined text set.

DETAILED DESCRIPTION OF EXEMPLARY EMBODIMENTS

Figure 1:
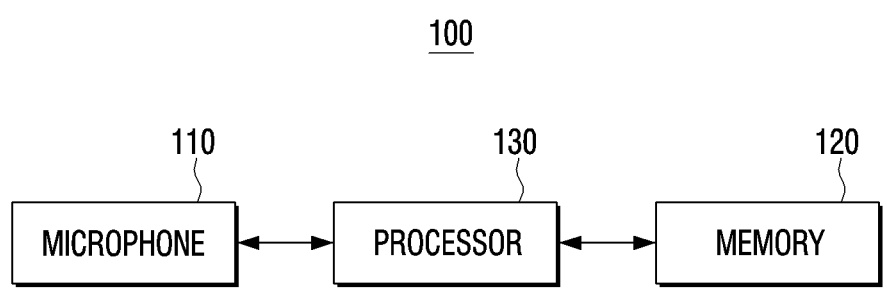
FIG. 1 is a block diagram showing a configuration of an electronic device of an embodiment.

The disclosed way of the specification and the drawings will be described before specifically describing the disclosure.

First, the terms used in the specification and claims have been selected as general terms in consideration of functions in embodiments of the disclosure, but these may vary in accordance with the intention of those skilled in the art, legal and technical interpretation, the emergence of new technologies and the like. In addition, some terms are arbitrarily selected by the applicant. Such terms may be interpreted as the meaning defined in this specification, and unless otherwise specifically defined, the terms may be interpreted based on general content of this specification and typical technical knowledge in the technical field.

In addition, the same reference numerals or symbols shown in the accompanying drawings of the specification show parts or elements executing substantially the same function. For convenience of description and understanding, the description will be made using the same reference numerals or symbols in different embodiments. That is, although all of elements having the same reference numeral are shown in a plurality of drawings, the plurality of drawings do not mean one embodiment.

In addition, terms including the ordinal umbers such as "first", "second", and the like may be used for distinguishing an element from another in the specification and claims. Such ordinal numbers are used for distinguishing the same or similar elements from each other and the meaning of the term should not be limitedly interpreted by using such ordinal numbers. For example, an element with such an ordinal number should not be limited in terms of a usage order or arrangement order due to the number thereof. If necessary, the ordinal numbers may be interchangeably used.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module", "unit", or "part" in embodiments of the disclosure is a term indicating an element performing at least one function or operation, and such an element may be implemented as hardware, software, or a combination of hardware and software. Further, except for when each of a plurality of "modules", "units", "parts" and the like needs to be realized in an individual specific hardware, the components may be integrated as at least one module or chip and be implemented as at least one processor (not shown).

In addition, in embodiments of the disclosure, if it is described that a certain part is connected to another part, this includes not only direct connection but also indirect connection through still another medium. Further, the expression "a certain part includes another element" does not exclude other elements not disclosed, but means that other elements may be further included, unless otherwise noted.

Hereinafter, the disclosure will be described in detail with reference to the accompanying drawings.

FIG. 1 is a block diagram showing a configuration of an electronic device of an embodiment of the disclosure. Referring to FIG. 1, an electronic device 100 includes a microphone 110, a memory 120, and a processor 130.

The electronic device 100 may be implemented as, for example, an analog TV, a digital TV, a 3D TV, a smart TV, an LED TV, an OLED TV, a plasma TV, a monitor, a curved TV with a screen having a fixed curvature, a flexible TV with a screen having a fixed curvature, a bended TV with a screen having a fixed curvature, and/or a bendable TV having an adjustable curvature of a current screen by a received user input, but there is no limitation thereto.

The microphone 110 may receive a user's speech and generate a speech signal corresponding to the received speech. In FIG. 1, the microphone 110 is implemented to be provided in the electronic device 100, but may be an external microphone separately configured outside of the electronic device 100 and electrically connected to the electronic device 100.

The memory 120 may be implemented as a non-volatile memory (e.g., hard disk, solid state drive (SSD), or flash memory), a volatile memory, and the like, and may store text information, image contents, and information regarding the functions of the electronic device 100.

The memory 120 may store a plurality of text sets. For example, each of the text sets may include a sentence regarding daily information such as "What time is it now?" or "How is the weather today?", an instruction sentence regarding a function executable by the electronic device 100, a sentence requesting for specific information, and the like, and may also include electronic program guide (EPG) information. However, the text set is not limited to the above-mentioned elements.

The information regarding the plurality of text sets stored in the memory 120 may be added, removed, or changed by the control of the processor 130.

The processor 130 may control the microphone 110 to receive a speech, control the memory 120 to store data, or receive data from the memory 120. The processor 130 may be an element configured to control elements included in the electronic device 100.

The processor 130 may convert a speech signal obtained by receiving utterance of a user via the microphone 110 into text, and then compare this with each of the text sets stored in the memory 120 in a word unit. However, the comparison is not limitedly performed in the word unit and may be performed in a unit of syllable, consonant, vowel, letter, or alphabet.

In addition, the processor 130 may determine a text set having a highest degree of coincidence by considering a ratio or an order of words coinciding between the text converted from the speech signal and each of the text sets stored in the memory.

The processor 130 may determine one or more candidates among the texts based on the order of words, and determine a final text set by considering a ratio of words coinciding between the determined candidates and the text converted from the speech signal.

In such a case, there is no need to calculate the ratio with respect to all of the stored text sets, since the order of the common words is used when determining the candidates. Therefore, it is advantageous in terms of improving a speed of the entire process.

In addition, in the embodiment, it can be said that both the speed and the accuracy of the speech recognition result matching are obtained, since it is possible to perform the precise determination using the ratio after selecting the candidate text sets.

Further, the processor 130 may calculate the ratio of words in each of the text sets coinciding with the text converted from the speech signal, set only text sets having a ratio higher than a predetermined threshold value as candidates, and select a text set having a highest ratio of words coinciding with the text converted from the speech signal among the candidates.

In such a case, if there are no text sets having a ratio higher than the predetermined threshold value, the processor 130 may control the electronic device 100 to execute functions of notifying a user that no results are obtained, requesting additional utterance, or inquiring about resetting of the predetermined threshold value, and the like.

The processor 130 may search for words in each of the plurality of stored text sets common to the words in the text converted from the speech signal, and determine at least one text set based on a first ratio of common words searched in each of the text sets and a second ratio of common words searched in the text converted from the speech signal.

In such a case, the processor 130 may determine a text set having at least one ratio of the first ratio and the second ratio that is higher than the predetermined ratio as a result text set. If the number of text sets having a ratio higher than the predetermined ratio is more than one, the processor 130 may select a text set having a highest first ratio or second ratio among the plurality of text sets as the result text set, or display a UI in which the plurality of text sets satisfying the predetermined ratio are arranged in the order of at least one ratio of the first ratio and the second ratio thereof and allow a user to select them.

In addition, in regard to the first ratio and the second ratio, ratios as threshold values may be set differently. In regard to each of the first ratio and the second ratio, if the number of text sets having a ratio higher than the predetermined ratio is more than necessary, the ratio as the threshold value may be decreased, and if there are no text sets having a ratio higher than the predetermined ratio, the ratio as the threshold value may be increased.

The predetermined threshold value may be set in accordance with a kind of language, a frequency of use of each word included in the text converted from the speech signal, a kind of electronic device, the number of standard texts including each word included in the text converted from the speech signal, sentence completeness of the text converted from the speech signal, a degree of noise of the speech signal, and the like.

There are a plurality of methods for determining the coincidence of the each word. For example, only when all syllables are coincide or syllables are coincide at a ratio equal to or higher than the predetermined ratio by comparing each syllable or letter, it may be determined that the words coincide, or this may be determined based on a unit of basic characters such as consonant, vowel, or alphabet.

When determining the coincidence of words, it may be determined which unit is to be used, by using a length of time of the speech signal, a data volume of the text converted from the speech signal, a kind of language, a kind of electronic device, a frequency of use of each word included in the text converted from the speech signal, an error possibility of each word included in the text converted from the speech signal determined by the electronic device, and the like.

The processor 130 that has determined the text set according to the various determination methods described above may execute an event corresponding to the determined text set.

Figure 2:
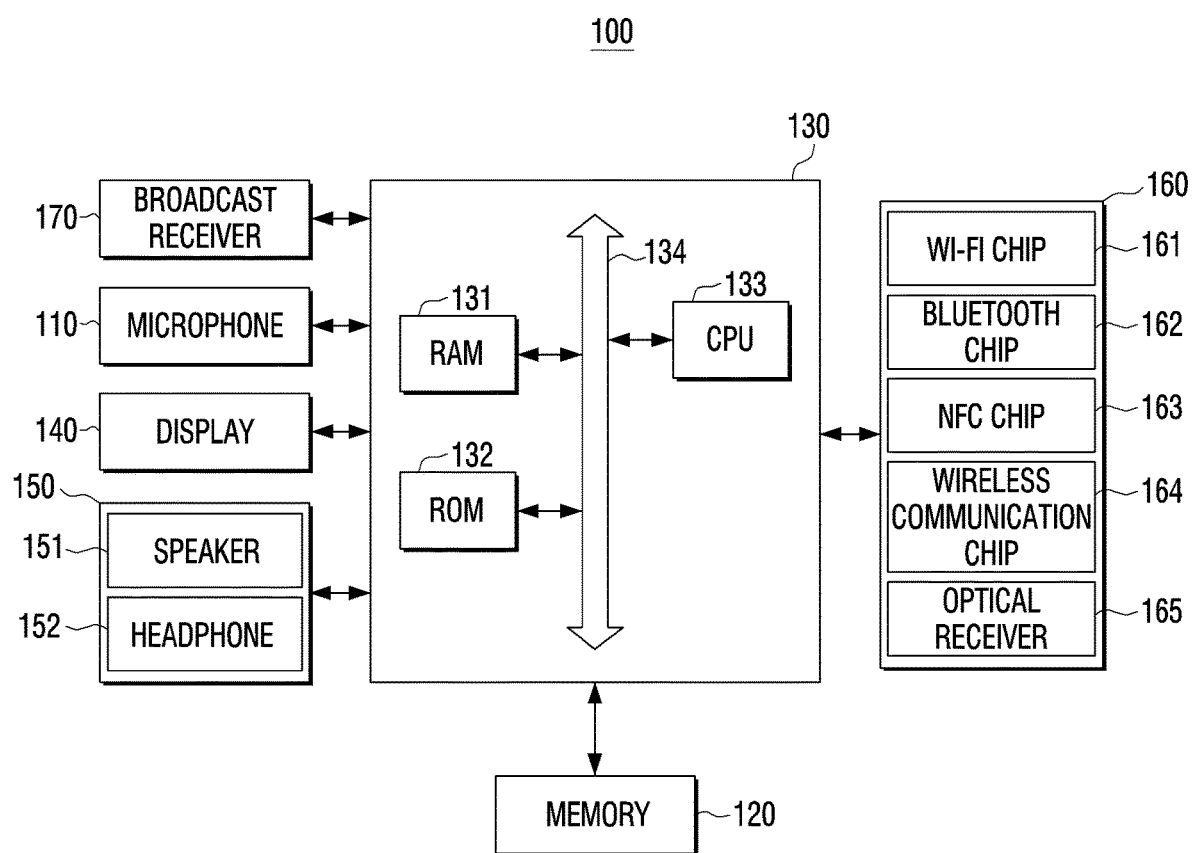
FIG. 2 is a block diagram showing a configuration of an electronic device according to various embodiments for speech recognition result matching.

FIG. 2 is a block diagram showing a configuration in a case where the electronic device 100 is implemented as a TV as one of various embodiments of the disclosure for speech recognition result matching. In the description of FIG. 2, the description regarding the configuration overlapped with FIG. 1 will be omitted.

Referring to FIG. 2, the electronic device 100 may include the microphone 110, the memory 120, the processor 130, a display 140, a speech output unit 150, and a communicator 160 as hardware elements. The electronic device 100 may further include a broadcast receiver 170 that receives a broadcast signal.

The processor 130 may include a RAM 131, a ROM 132, a CPU 133, and a system bus 134. The RAM 131, the ROM 132, the CPU 133, and the like may be connected to each other via the system bus 134 and transmit and receive various pieces of data or signals.

The ROM 132 stores instruction sets for system booting, and the CPU 133 copies an operating system stored in a storage (not shown) of the electronic device 100 according to the instruction stored in the ROM 132 and boots up the system by executing the 0/S.

After the booting, the CPU 133 may copy various applications stored in the storage of the electronic device 100 to the RAM 131 and execute various operations by executing the applications. Only one CPU 133 is included in FIG. 3, but in the implementation, this may be implemented as a plurality of CPUs, DSPs, or SoCs.

The CPU 133 accesses the storage (not shown) and executes the booting by using the 0/S stored in the storage. The CPU 133 executes various operations by using various programs, contents, pieces of data, and the like stored in the storage. Meanwhile, the memory 120 may be an element included in the storage or the storage may be an element included in the memory 120.

The display 140 may be implemented as a liquid crystal display (LCD), a cathode-ray tube (CRT), plasma display panel (PDP), organic light emitting diodes (OLED), a transparent OLED (TOLED), and the like. If the display 140 is formed of the LCD, the display 140 may include a driving circuit or a backlight unit which may be implemented in a form of an a-si TFT, a low temperature poly silicon (LTPS) TFT, an organic TFT (OTFT), and the like. The display 140 may be implemented in a form of touch screen that is able to detect a touch manipulation of a user.

The speech output unit 150 is an element for outputting sounds, and may output, for example, a sound included in a broadcast signal received via a tuner (not shown), a sound input via the communicator 160 or the microphone 110, or a sound included in an audio file stored in the memory 120.

In addition, the audio output unit 150 may include a speaker 151 and a headphone output terminal 152. The audio output unit 150 may receive a result signal from the processor 130 and may output a sound corresponding to the control of the processor 130.

The communicator 160 is an element executing communication with various kinds of external devices according to communication systems. The communicator 160 may be connected to an external device via a local area network (LAN) or the Internet, or may be connected to an external device in a wireless communication system (for example, wireless communication such as Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, or WiBRO).

The communicator 160 includes various communication chips such as a Wi-Fi chip 161, a Bluetooth chip 162, an NFC chip 163, and a wireless communication chip 164. The Wi-Fi chip 161, the Bluetooth chip 162, and the NFC chip 163 execute communication in the Wi-Fi system, the Bluetooth system, and the NFC system, respectively. In addition, the communicator 160 may include an optical receiver 165 that is able to receive a control signal (for example, an IR pulse) from an external device (not shown) or a server (not shown).

The wireless communication chip 164 indicates a chip executing the communication based on various communication standards such as IEEE, Zigbee, 3rd Generation (3G), 3rd Generation Partnership Project (3GPP), or Long Term Evolution (LTE).

The CPU 133 determines the text set corresponding to the speech signal among the plurality of text sets stored in the memory 120 in advance and then executes a function corresponding to the determined text set.

In addition, the CPU 133 may control the display 140 to display the text converted from the input speech signal, the determined text set, or the result of the execution of the function corresponding to the determined text set on the display 140.

The CPU 133 may control the audio output unit 150 to output the determined text set or the result of the execution of the function corresponding to the determined text set as sounds via the speaker 151 or the headphone 152.

The communicator 160 that is able to transmit and receive data to and from an external device (not shown) may transmit the speech signal, the converted text of the speech signal, or the determined text set information to an external device or receive additional text set information from an external device under the control of the CPU 133. The CPU 133 may add, change, or remove the text set information stored in the memory 120.

The broadcast receiver 170 may tune and select only a frequency of a channel to be received by the electronic device 100 among a plurality of radio wave components through amplification, mixing, and resonance of a broadcast signal received in a wired or wireless manner. The broadcast signal may include videos, sounds, and additional data (e.g., electronic program guide (EPG)).

The broadcast receiver 170 may receive videos, sounds, and data in a frequency band corresponding to a channel number corresponding to a user input.

The broadcast receiver 170 may receive a broadcast signal from various sources such as terrestrial broadcast, cable broadcast, satellite broadcast, and the like. The broadcast receiver 170 may also receive a broadcast signal from a source such as an analogue broadcast or a digital broadcast.

The broadcast receiver may be implemented as a component of the all-in-one electronic device 100 or may be implemented as a separate device (e.g., a set-top box or a tuner connected to an input and output unit (not shown)) including a broadcast receiving unit electrically connected to the electronic device 100.

Figure 3:
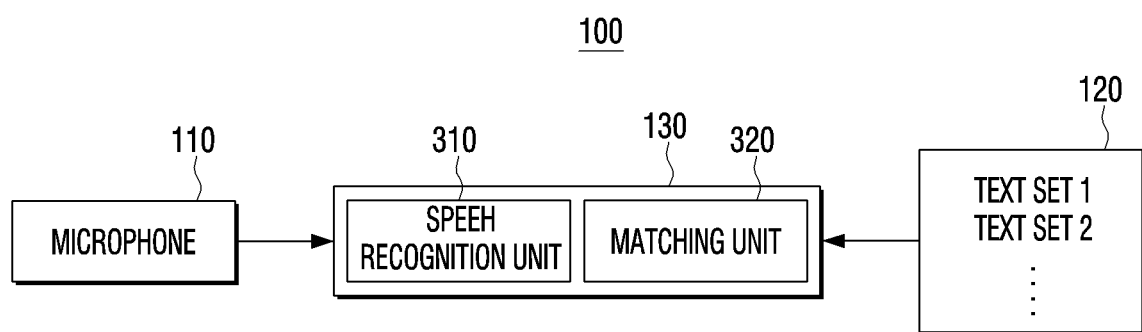
FIG. 3 is a block diagram showing a configuration of a processor and a text set stored in a memory by specifying FIG. 1.

FIG. 3 is a block diagram showing a configuration of the processor and an embodiment of including the memory storing the text set. Referring to FIG. 3, the processor 130 may include a speech recognition unit 310 and a matching unit 320.

The speech recognition unit 310 may convert a speech signal obtained by an input of utterance of a user from the microphone 110 into text data and transmit the text data obtained by converting the speech signal to the matching unit 320.

The matching unit 320 may receive each of the text sets stored in the memory 120 from the memory 120 and determine a text set having a highest degree of coincidence as a text set corresponding to the utterance of a user by comparing each of the received text sets with the converted text of the speech signal transmitted by the speech recognition unit.

In an embodiment, the matching unit 320 may divide the text converted from the input speech signal in a unit of words, calculate the numbers of divided words and coinciding words included in each of the text sets, and determine a text set having a highest degree of coincidence based on the ratio of the numbers of words included.

Figure 4:
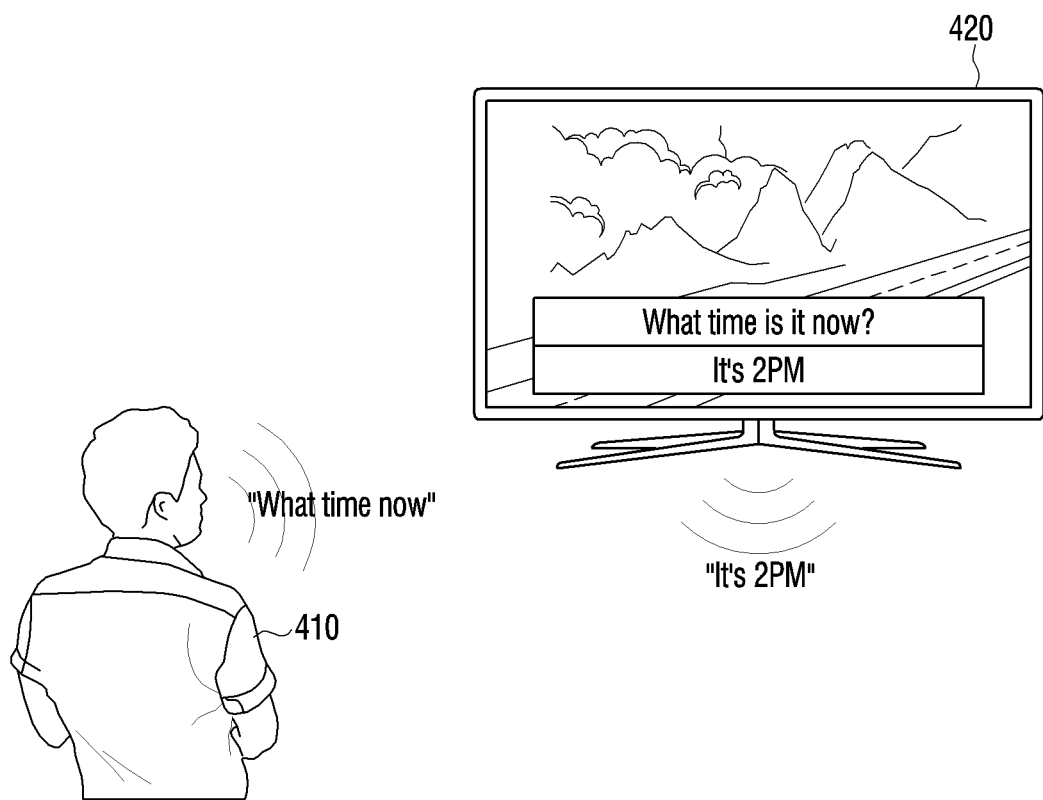
FIG. 4 is a view for describing an example of an electronic device which recognizes an entire text from utterance of some text of a user and executes a function corresponding to the entire text.

FIG. 4 is a view for describing an example of an electronic device which recognizes the entire text from utterance of some text of a user and executes a function corresponding to the entire text.

FIG. 4 shows a user 410 uttering a voice and an electronic device 420. In FIG. 4, a user 410 who wants to know the current time may wish to receive information regarding the current time from the electronic device 420 visually or acoustically by uttering a sentence such as "What time is it now?". The sentence "What time is it now?" is an example of the text set mentioned above.

FIG. 4 shows a case where the user 410 utters only "What time now", instead of the entire sentence such as "What time is it now?". In such a case, the electronic device 420 may acquire a text "What time now" by converting a speech signal based on the utterance of the user and then, detect "What", "time", and "now" from "What time now".

The electronic device 420 may select text sets including the words coinciding with "What", "time", or "now" at a predetermined ratio or higher among the plurality of text sets stored in advance as candidates, and determine "What time is it now?" which is a text set having a highest ratio as a sentence intended by a user.

Referring to FIG. 4, the electronic device 420 may display that the electronic device 420 has recognized "What time is it now?" based on the result obtained by determining "What time is it now?" including words coinciding with any one of "What", "time", or "now" among the plurality of sets at the highest ratio as the utterance of the user. Since the text, that is, "What time is it now?" is a question, the electronic device 420 may display "It's 2 PM" as an answer of the text together with "What time is it now?" and output the answer as a sound.

The embodiment of the disclosure is not limited to FIG. 4. For example, if the electronic device 420 is a TV and a content of the utterance of a user is determined as a text set for changing a channel to channel 999, the electronic device 420 may execute the function of the electronic device 100 as itself such as changing the channel of the TV to channel 999.

Figure 5:
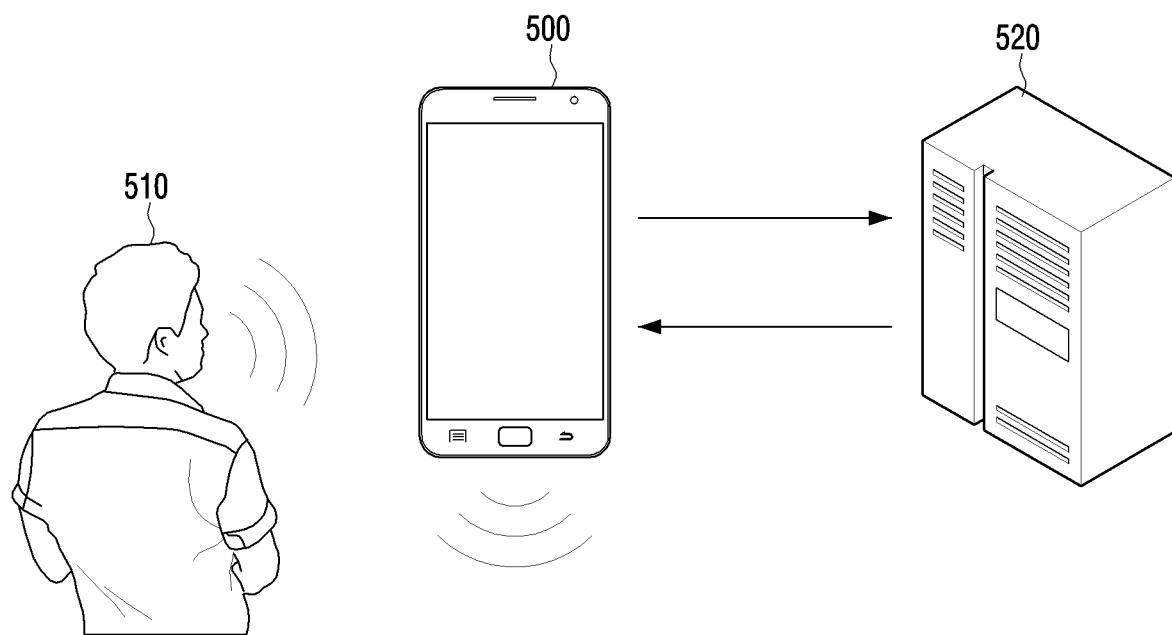
FIG. 5 is a view for describing an example of an electronic device which shares a speech signal and text information with a server for the speech recognition result matching and outputs the recognition result.

FIG. 5 is a view for describing embodiments of an electronic device and a server outputting a recognition result by transmitting and receiving a speech signal and text information for speech recognition result matching.

In an embodiment of FIG. 5, when a user 510 utters words with respect to an electronic device 500, the electronic device 500 may transmit a speech signal converted from a speech of the user to a server 520 and convert the speech signal into corresponding text at the same time.

Then, the server 520 which has received the speech signal converts the speech signal into the corresponding text, extracts words in each of a plurality of text sets stored in the server 520 in advance common to words in the text converted from the speech signal, and selects text sets as candidates by considering the order or ratio of the common words included.

Next, when the server 520 transmits the selected candidate text sets to the electronic device 500, the electronic device 500 may extract words in each of the candidate text sets selected by the server 520 that are common to words in the text converted from the speech signal, and determines one text set from the candidate text sets by considering the order or ratio of the common words included.

In addition, the electronic device 500 may transmit data regarding the text converted from the speech signal to the server 520, not the speech signal. In such a case, the server 520 is not necessarily convert the speech signal into text autonomously.

In a case where the electronic device 500 transmits all of the speech signal and the data regarding text converted from the speech signal to the server 520 and the server 520 also converts the speech signal into text, if the text converted from the speech signal by the electronic device 500 does not coincide with the text converted from the speech signal by the server 520, the server 520 may give a feedback about information regarding the text converted from the speech signal by the electronic device 500.

This is able to compensate the problem that the process of selecting the candidates from many text sets stored in advance may take a long time. Therefore, it is advantageous that the server 520 may determine whether or not each of all of the text sets stored in advance becomes the candidate text and continuously transmit the determined candidate text to the electronic device 500 in real time, and at the same time, the electronic device 500 may calculate the ratio of each of the candidate text sets received from the server 520 in real time, thereby reducing a period of time for deriving the final result.

In another embodiment of FIG. 5, the electronic device 500 may execute an input of a speech signal and an output of a result mainly in a relationship with the user, and the server 520 may select a result text set by using data corresponding to the speech signal received from the electronic device 500 and a plurality of text sets stored in the server 520 in advance, and then transmit the selected text set to the electronic device 500 again.

At this time, the server 520 may determine one or more candidates from the text sets based on the order of words, and finally determine one text set by considering the ratio of words in only the determined candidates coinciding with words in the text converted from the speech signal.

In addition, the server 520 may calculate a ratio of words in each of the stored text sets coinciding with words in the text converted from the speech signal, set only the text sets having a ratio higher than a predetermined threshold value as candidates, and select a text set having a highest ratio of the words coinciding with the text converted from the speech signal among the candidates.

The server 520 may search for a word in each of the plurality of stored text sets common to a word in the text converted from the speech signal, and determine at least one text set based on a first ratio of the common word searched in each of the text sets and a second ratio of the common word searched in the text converted from the speech signal.

In such a case, the server 520 may determine a text set having at least one ratio of the first ratio and the second ratio that is higher than the predetermined ratio as the at least one text set. If the number of text sets having a ratio higher than the predetermined ratio is more than one, the server 520 may select a text set having a highest first ratio or second ratio among the plurality of text sets as the result text set and transmit the result text set to the electronic device 500, or transmit data in which the plurality of text sets satisfying the predetermined ratio are arranged in the order of at least one ratio of the first ratio and the second ratio thereof to the electronic device 500 and display a UI corresponding to the data on the electronic device 500 to allow a user to directly select the text set.

In addition, in regard to the first ratio and the second ratio, the server 520 may set the ratios as threshold values differently. In regard to each of the first ratio and the second ratio, if the number of text sets having a ratio higher than the predetermined ratio is more than necessary, the ratio as the threshold value may be decreased, and if there are no text sets having a ratio higher than the predetermined ratio, the ratio as the threshold value may be increased.

The predetermined threshold value may be set in accordance with a kind of language, a frequency of use of each word included in the text converted from the speech signal, a kind of electronic device, the number of standard texts including each word included in the text converted from the speech signal, sentence completeness of the text converted from the speech signal, a degree of noise of the speech signal, and the like.

In such a case, if there are no text sets having a ratio higher than the predetermined threshold value among the plurality of text sets stored in the server 520, the server 520 may transmit an instruction to allow the electronic device 500 to execute functions of notifying a user that no results are obtained, requesting additional utterance, or inquiring about resetting of the predetermined threshold value, and the like.

In such a case, the information regarding the plurality of text sets stored in the server 520 may be updated, removed, or changed by using data transmitted to the server 520 from another external device (not shown) connectable to the server 520.

In the embodiment of FIG. 5, the electronic device 500 may transmit the text converted from the speech signal to the server 520 or transmit data in a form other than the speech signal or the text to the server 520. If the data is received in a form other than the text, the text corresponding to the speech signal may be directly extracted in the server 520.

In addition, the server 520 may transmit the data regarding the determined text set to the electronic device 500 and also transmit an output instruction of the determined text set or an execution instruction of an event corresponding to the text set to the electronic device 500.

In such a case, the electronic device 500 may display the text set determined by the server 520 through a display or output a sound via a speaker or a headphone according to the instruction of the server 520.

If the determined text set is a question, the electronic device 500 may display an answer of this question through a display or output a sound via a speaker or a headphone according to an instruction of the server 520.

In addition, the electronic device 500 may execute a function or an event corresponding to the text set determined by the server 590 according to the instruction of the server 590. In addition, the electronic device 500 may output the text set determined by the server 590 or execute the function according to the instruction of the server 590 and then transmit report data reporting the output or execution to the server. In such a case, the server 590 which has not received the report data even after the predetermined period of time may transmit the instruction again.

The updating, removing, or changing of the plurality of pieces of text set information stored in the server 520 may be performed by considering the number of times or the ratio of the selection of each of the text sets stored as the speech recognition result of external devices connectable to the server.

In addition, the server 520 may store the plurality of pieces of the text set information by dividing these for each external device connectable to the server and capable of performing speech recognition.

As an example of each electronic device 500, if the electronic device 500 is a navigations system, a ratio of the text sets corresponding to place names or traffic information may be high in a plurality of text sets stored in the server 520 for speech recognition of the navigation system.

In addition, if the electronic device 500 is a TV, a ratio of text sets regarding broadcast programs or TV functions may be high in a plurality of text sets stored in the server 520 for speech recognition of the TV.

If the electronic device 500 is a smartphone, a plurality of text sets stored in the server 520 for speech recognition of the smartphone may be stored separately for each application used in the smartphone.

In each embodiment relating to FIG. 5, the function executed by the electronic device 500 and the server 520 separately may be performed by two configurations in one electronic device.

Figure 6:
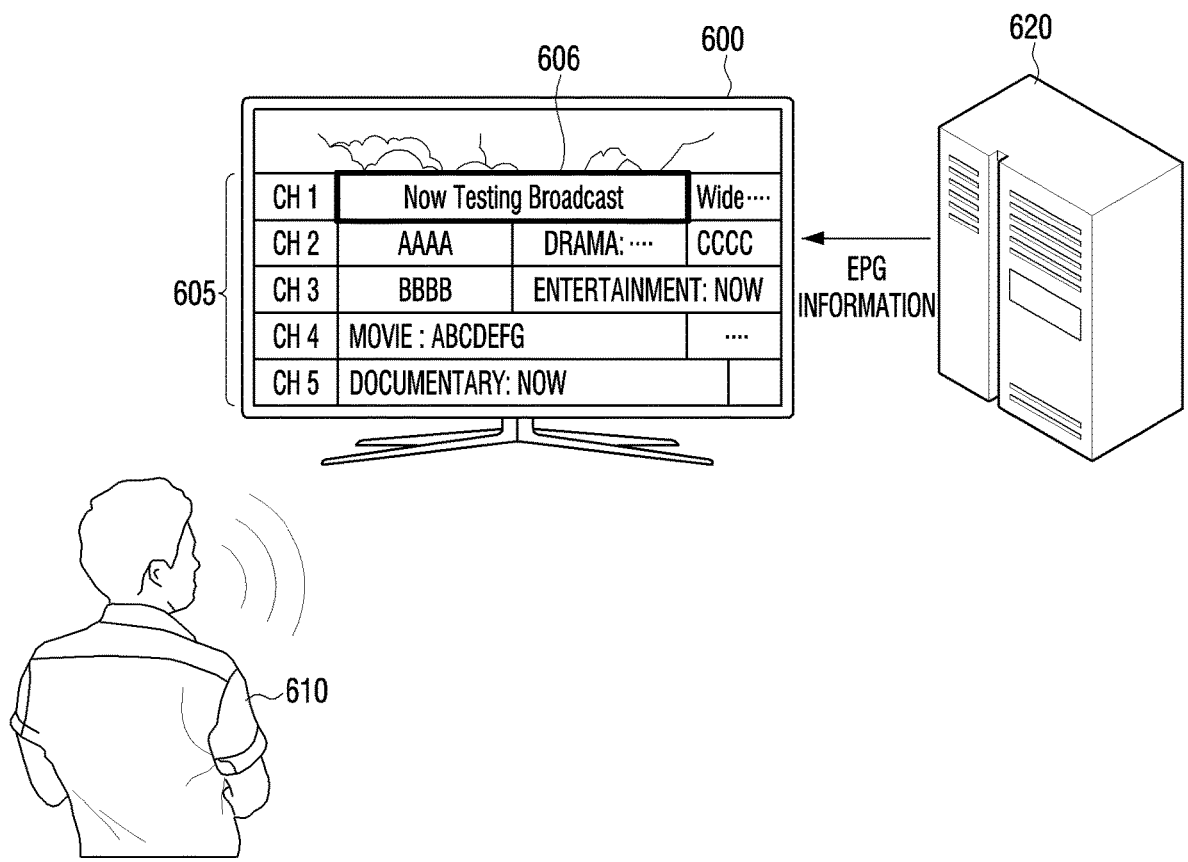
FIG. 6 is a view for describing an example in which the speech recognition result matching is applied to an EPG.

FIG. 6 is a view for describing an example in which the speech recognition result matching is applied to an EPG. FIG. 6 shows speech recognition and matching between a user 610, an electronic device 600, and a server 620 as an embodiment in which the electronic device 600 is a TV.

The electronic device 600 may receive electronic program guide (EPG) information from the server 620 by using a communicator (not shown) or receive the EPG information in a form of a broadcast signal including the EPG information that is received from the outside from a broadcast receiver (not shown), and FIG. 6 shows a state in which the electronic device 600 extracts broadcast program information and information regarding an EPG function included in the received EPG information as text sets and stores the extracted text sets in a memory (not shown).

In such a case, when a text set determined by utterance of a user corresponds to any one piece of the EPG information, the electronic device 600 may generate an event regarding the corresponding EPG information. (In addition, the communicator (not shown) and the memory (not shown) may be provided in the electronic device 600 or separately provided and electrically connected thereto.)

Referring to FIG. 6, EPG information 605 regarding the current time among the pieces of the received EPG information may be displayed on the electronic device 600 as the EPG information 605 of the corresponding time by an instruction of the user 610, and pieces of broadcast program information included in the EPG 605 of the corresponding time are converted into text sets and stored in the memory in advance.

In such a state, if the user 610 sees the displayed EPG information 605 of the corresponding time and wants to change the channel to a channel on which "Now Testing Broadcast" 606 which is a desired broadcast program is broadcast or wants to acquire information regarding the "Now Testing Broadcast" 606, even when the user only utters, for example, "Now Test", "Now Testing", or Testing Broadcast", without the need to utter the entire "Now Testing Broadcast" 606, the electronic device 606 may recognize that the "Now Testing Broadcast" 606 having a highest degree of coincidence of the words among the broadcast programs or functions included in the EPG information 605 of the corresponding time corresponds to the intention of the utterance of the user, by considering that the EPG is currently displayed.

In such a case, the electronic device 600 may change the channel to the channel on which the "Now Testing Broadcast" 606 is broadcast, display specific information regarding the "Now Testing Broadcast" 606, or recording, scheduled recording, scheduled viewing, and the like regarding the corresponding channel.

Figure 7:
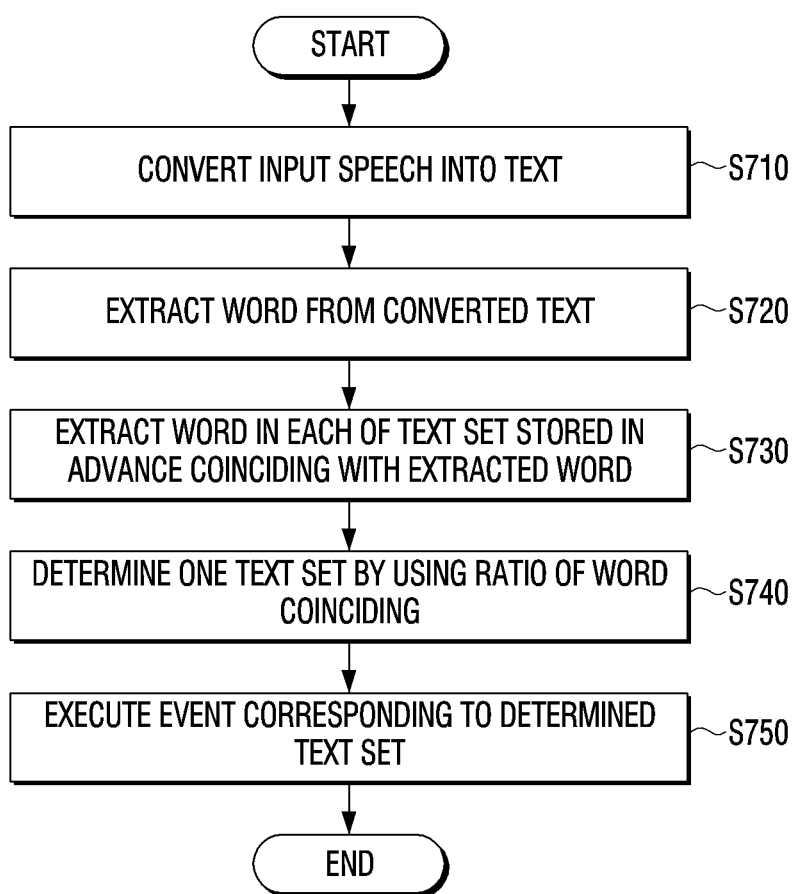
FIG. 7 is a flowchart showing steps of a speech recognition method performed by an electronic device as an embodiment.

FIG. 7 is a flowchart showing steps of a speech recognition method performed by the electronic device as an embodiment of the disclosure.

Referring to FIG. 7, first, a speech input through utterance of a user is converted into a speech signal via a microphone and the converted speech signal is converted again into text (S710). The speech of the user to be converted may have a pause of the speech equal to or shorter than a predetermined period of time or may have an entire time length of the user's speech not longer than another predetermined period of time.

Then, words included in the text converted from the speech signal is extracted (S720). In such a case, the number of extracted words may be stored in the electronic device. The parts not extracted as words may be words stored in advance, and therefore, data regarding the parts may be transmitted to an external device connectable to the electronic device to acquire necessary information regarding the parts not extracted as words.

The matters to be extracted from the text converted from the speech signal are not necessarily in the unit of words. That is, the extraction may be performed in different kinds of units of syllables, letters, consonants, vowels, and alphabets according to kinds of languages, and the extracted matter may be compared with the plurality of text sets stored in advance.

Next, after extracting the words included in the text converted from the speech signal, the words in each of the text sets stored in advance common to the words in the text converted from the speech signal may be searched and extracted (S730). At this time, the number of words in each of the text sets stored in advance common to the words in the text converted from the speech signal may be stored.

Then, one text set is finally determined by using a ratio of the words in each of the text sets stored in advance common to the words in the text converted from the speech signal (S740). At this time, not only the ratio, but also the order of the common words included may be considered.

Candidates may be selected among the plurality of text sets stored in advance based on the common words and the order of the common words included, and one text set may be finally determined by using the ratio of the common words among the plurality of text sets.

Herein, to use the ratio of the words in each of the text sets stored in advance common to the words in the converted text may mean to calculate and use at least any one of a first ratio between the number of common words and the number of words extracted from the text converted from the speech signal and a second ratio between the number of common words and the number of words extracted from each of the text sets stored in advance.

In such a case, a threshold value may be set for the first ratio and the second ratio, and only text sets having a ratio higher than the threshold value may be set as candidates or the candidates may be set based on the order of the common words included. Then, one text set may be determined among the text sets stored as the candidates, by using at least any one of the first ratio or the second ratio.

If the number of text sets having a ratio higher than the predetermined ratio is more than one, a UI in which the plurality of text sets are arranged in the order of at least one ratio of the first ratio and the second ratio thereof may be displayed.

When one text set is determined, an event corresponding to the determined text set may be executed (S750). Specifically, the determined text set may be simply displayed or output as a sound as it is, or if the determined text set is a question, an answer of the question may be displayed or output as a sound. If the determined text set relates to a specific function of the electronic device, the corresponding function may be executed by the electronic device.

Even when at least one of the first ratio or the second ratio is considered, if there are not text sets stored in advance having a ratio higher than the predetermined threshold value, no results or necessity of additional utterance may be displayed or output as a sound.

In addition, information regarding a speech signal not matched may be transmitted to an external device such as a server, and additional information regarding this may be received again and stored in the electronic device. In such a case, if the same speech signal and the converted text are obtained by the utterance of a user in another situation, the function corresponding to the intention of the user may be executed by using the additional information stored in advance.

In the disclosure, as an embodiment relating to FIG. 7, a step of receiving the EPG information and storing broadcast program information included in the EPG information in a memory as text sets may be further included in advance.

In such a case, in an embodiment of Step S750 of executing an event corresponding to the determined text set, when the determined text set corresponds to the EPG information stored in advance, functions such as changing, recording, scheduled recording, scheduled viewing, information providing, and the like of the channel of the broadcast program corresponding to the EPG information may be provided to a user.

Figure 8:
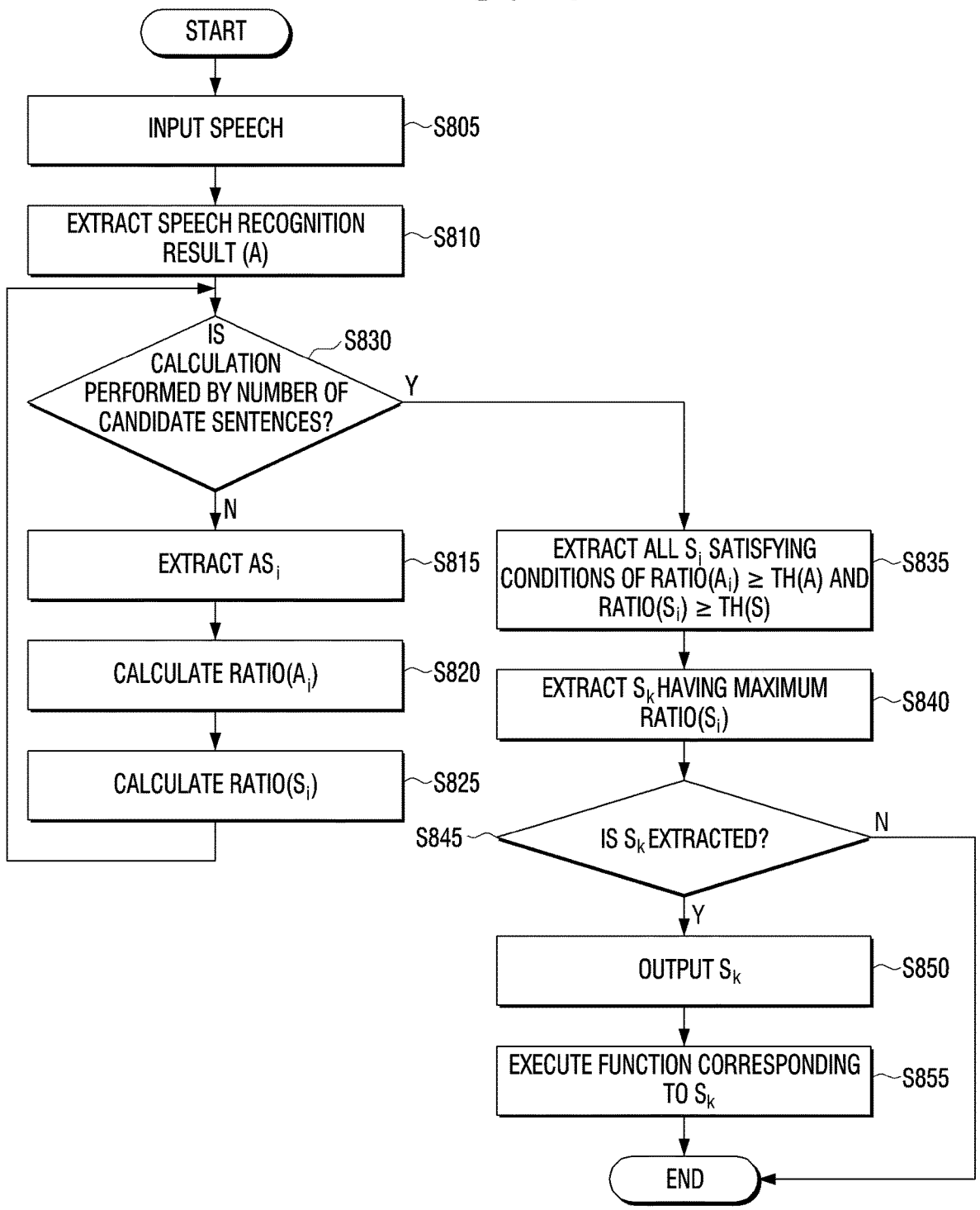
FIG. 8 is a flowchart for describing another embodiment showing a determination process for speech recognition performed by the electronic device.

FIG. 8 is a flowchart for describing another specific embodiment showing a determination process for speech recognition performed by the electronic device.

Before describing FIG. 8, the number of candidate sentences is denoted as n, a recognition result sentence is denoted as A, and a candidate sentence currently being processed is denoted as Si. Referring to the description prior to FIG. 8, the candidate sentences correspond to the text sets stored in advance and the recognition result sentence corresponds to the text converted from the speech signal. In FIG. 8, it is assumed that $1 \leq i \leq n$.

Regarding the selection of the candidate sentences among all of the sentences stored in advance, all of the sentences stored in advance may be simply selected as candidates or the selection may be performed based on at least any one of the order or the ratio of words included therein common to words in the recognition result sentence.

Referring to FIG. 8, first, when a speech is input (S805), a speech recognition result sentence A based on the speech may be extracted (S810). Referring to the description hereinabove, this is a process of obtaining text by converting a speech signal.

Next, words $AS_i$ commonly included in the recognition result text A and each of the candidate sentences $S_i$ may be extracted (S815). Based on this, a recognition result inclusion degree of $AS_i$ with respect to A, that is, Ratio ($A_i$) which is a ratio of $AS_i$ included in A may be calculated (S820). In addition, a candidate sentence inclusion degree of $AS_i$ with respect to $S_i$, that is, Ratio ($S_i$) which is a ratio of $AS_i$ included in Si may be calculated (S825).

Steps S815 to S825 may be repeated with respect to all of the candidate sentences stored in advance (S830), and accordingly, this process may be repeated by n times that is the number of candidate sentences.

Next, among all of the candidate sentences, the candidate sentences having Ratio ($A_i$) equal to or higher than a threshold value TH(A) of the recognition result inclusion degree or Ratio ($S_i$) equal to or higher than a threshold value TH(S) of the candidate sentence inclusion degree(S835). Then, among the candidate sentences extracted in S835, a candidate sentence $S_k$ having the maximum recognition result inclusion degree may be extracted (S840).

In such a case, if there are no candidate sentences extracted in S835, it is not possible to extract $S_k$, and thus, the process may end since Sk is not able to output (S845-N). In contrast, when there are candidate sentences extracted in S835 and $S_k$ is extracted (S845-Y), $S_k$ is output (S850) and a function corresponding to $S_k$ may be executed (S855).

In the above process, the number of words of the sentence is extracted and used for calculating the ratio, but there is no limitation to the above examples, since the process may be performed based on any one of the number of letters, the number of phrases, the number of syllables, not only the number of words.

The language which is a reference of the speech recognition may be a language set as a default language, manually set by a user, or automatically set based on the language set for objects of the electronic device 100. In the automatic setting, for example, the language set for objects may be confirmed by applying optical character recognition (OCR) to objects displayed on the electronic device 100.

According to various embodiments described above, it is possible to perform speech control regarding objects set with various languages, and it is possible to execute speech recognition, even when a user utters only some key words with no needs to utter the entire sentence. Therefore, it is possible to improve a user convenience.

The embodiments described above may be implemented in a recording medium readable by a computer or a similar device using software, hardware, or a combination thereof.

In the implementation in terms of hardware, the embodiments described in the disclosure may be implemented by using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for executing other functions.

In some cases, the embodiments described in the disclosure may be implemented as the processor 130 itself. In the implementation in terms of software, the embodiments such as the procedures and functions described in the disclosure may be implemented as separate software modules. Each of the software modules described above may execute one or more functions and operations described in the disclosure.

Computer instructions for executing processing operations by the electronic device 100 according to the embodiments of the disclosure descried above may be stored in a non-transitory computer-readable medium. When the computer instructions stored in such a non-transitory computer-readable medium are executed by a processor of a specific machine, the computer instructions may enable the specific machine to execute the processing operations by the electronic device 100 according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. An electronic device comprising:
a microphone configured to receive a user voice input;
a memory configured to store a plurality of text sets; and
a processor configured to:
obtain text based on the user voice input received via the microphone,
obtain common words between words included in the obtained text and words included in a first text set among the plurality of text sets, and
identify whether the first text set is output based on at least one of a first ratio between the number of the common words included in the obtained text and the number of words included in the obtained text or a second ratio between the number of the common words included in the first text set and the number of words included in the first text set.

2. The device according to claim 1, wherein the processor is configured to, based on the first text set having at least one ratio of the first ratio or the second ratio that is higher than a predetermined ratio, output the first text set.

3. The device according to claim 2, wherein the processor is configured to, based on the number of text sets having the ratio higher than the predetermined ratio being more than one, display a UI in which the plurality of text sets are arranged in the order of at least one ratio of the first ratio or the second ratio of each of the plurality of text sets.

4. The device according to claim 1, wherein the processor is configured to identify whether the first text set is output based on at least one of the first ratio, the second ratio or an order of the obtained common words.

5. The device according to claim 1, wherein the processor is configured to:
obtain candidate text sets among the plurality of text sets based on the obtained common words and an order of the obtained common words; and
identify whether at least one text set is output based on a ratio of the obtained common words in each of the obtained candidate text sets.

6. The device according to claim 1, wherein the processor is configured to, based on determining that the first text set is output, execute an event corresponding to the first text.

7. The device according to claim 1, further comprising:
a communicator configured to receive EPG information, wherein the processor is configured to store broadcast program information included in the EPG information in the memory as the plurality of text sets.

8. The device according to claim 7, wherein the processor is configured to, based on the identified text set corresponding to the EPG information, generate an event regarding a broadcast program corresponding to the EPG information.

9. The device according to claim 8, wherein the event regarding the broadcast program is at least one of changing, recording, scheduled recording, and scheduled viewing of a channel of the broadcast program.

10. A speech recognition method of an electronic device, storing a plurality of text sets, comprising:
obtaining text based on a user voice input;
obtaining common words between words included in the obtained text and words included in a first text set among the plurality of text sets, and identifying whether the first text set is output based on at least one of a first ratio between the number of the common words included in the obtained text and the number of words included in the obtained text or a second ratio between the number of the common words included in the first text set and the number of words included in the first text set.

11. The method according to claim 10, further comprising:

based on the first text set having at least one ratio of the first ratio or the second ratio that is higher than a predetermined ratio, outputting the first text set.

12. The method according to claim 11, further comprising:

based on the number of text sets having the ratio higher than the predetermined ratio being more than one, displaying a UI in which the plurality of text sets are arranged in the order of at least one ratio of the first ratio or the second ratio of each of the plurality of text sets.

13. The method according to claim 10, wherein the determining comprises determining whether the first text set is output based on a at least one of the first ratio, the second ratio or an order of the obtained common words.

* * * * *

UNITED STATES PATENT AND TRADEMARK OFFICE
CERTIFICATE OF CORRECTION

PATENT NO. : 11,223,878 B2
APPLICATION NO. : 16/756382
DATED : January 11, 2022
INVENTOR(S) : Jae Hyun Bae Page 1 of 1

It is certified that error appears in the above-identified patent and that said Letters Patent is hereby corrected as shown below:

In the Claims

Column 17, Line 23:
In Claim 13, delete "on a" and insert --on--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*